United States Patent
Tsuruhara et al.

(10) Patent No.: US 7,031,874 B2
(45) Date of Patent: Apr. 18, 2006

(54) VEHICLE WHEEL SPEED CALCULATION DEVICE AND ANTI-SKID BRAKING CONTROL APPARATUS PROVIDED THEREWITH

(75) Inventors: Ryuzo Tsuruhara, Kariya (JP); Yasumi Inoue, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 0 days.

(21) Appl. No.: 10/940,008

(22) Filed: Sep. 14, 2004

(65) Prior Publication Data

US 2005/0075827 A1     Apr. 7, 2005

(30) Foreign Application Priority Data

Sep. 24, 2003  (JP)  ............................... 2003-331486

(51) Int. Cl.
  *G01P 3/00*  (2006.01)
  *G06F 15/00*  (2006.01)
(52) U.S. Cl. .................................................... 702/148
(58) Field of Classification Search ................ 702/148
  See application file for complete search history.

(56) References Cited

U.S. PATENT DOCUMENTS 5,541,859 A * 7/1996 Inoue et al. ................ 702/148
6,204,658 B1   3/2001 Stanusch et al.
6,445,176 B1   9/2002 Wallrafen
2002/0030481 A1 * 3/2002 Inoue et al. ................ 324/173
2004/0246117 A1 * 12/2004 Ogawa et al. .............. 340/445

FOREIGN PATENT DOCUMENTS

JP    A-10-73613    3/1998

OTHER PUBLICATIONS

German Office Action dated Sep. 13, 2005 with two sets of its English translation.

* cited by examiner

*Primary Examiner*—John Barlow
*Assistant Examiner*—Demetrius Pretlow
(74) *Attorney, Agent, or Firm*—Posz Law Group, PLC

(57) ABSTRACT

Numbers of teeth of respective rotors are obtained once and stored in an EEPROM. Then, when an ignition switch is initially turned on, vehicle wheel speeds for the respective vehicle wheels are derived based on the information about the numbers of teeth stored in the EEPROM. Accordingly, it is possible to obtain the vehicle wheel speeds even during a calculation period while the number of teeth of each rotor is being calculated each time the ignition switch is turned on. Further, it also becomes possible to perform ABS control prior to when the vehicle wheel speed calculation is completed.

12 Claims, 3 Drawing Sheets

VEHICLE WHEEL SPEED CALCULATION DEVICE AND ANTI-SKID BRAKING CONTROL APPARATUS PROVIDED THEREWITH

CROSS REFERENCE TO RELATED APPLICATION

This application is based upon and claims the benefit of Japanese Patent Application No. 2003-331486 filed on Sep. 24, 2003, the content of which are incorporated herein by reference.

1. Field of the Invention

The invention relates to a vehicle wheel speed calculation device and a vehicle wheel speed calculation method for calculating vehicle wheel speeds. More particularly, according to the invention, respective vehicle wheel speeds are calculated based on detection signals of respective vehicle wheel speed sensors that detect numbers of teeth (or switch numbers) of respective rotors that have teeth (or rotor switches).

2. Background of the Invention

Related art is known such as a vehicle wheel speed calculation device disclosed in Japanese Patent Laid-Open Publication No. Hei. 10-73613. In such art, a magnetic flux is generated toward a rotor which has a toothed wheel shape and a plurality of teeth. The magnetic flux changes along with rotation of the rotor, and the vehicle wheel speed sensor detects this magnetic flux change. Accordingly, the vehicle wheel speed calculation device is able to calculate a vehicle wheel speed based on a detection signal from the vehicle wheel speed sensor.

A rotor like that described above is attached to each of vehicle wheels that are mounted to the vehicle. However, in some cases, the number of teeth of the rotors attached to the front wheels is different to the number of teeth of the rotors attached to the rear wheels. For example, the rotors of the respective front wheels may have 102 teeth, whereas those of the rear wheels may have 108 teeth. In this case, after an ignition switch is turned on, it is assumed that the number of teeth is a number that is roughly intermediate between the respective numbers of teeth of the front and rear wheels, namely, in this case, around 105 teeth. Then, a reference vehicle wheel speed for reference use is calculated, and respective vehicle wheel speeds are calculated based on detection signals from the vehicle wheel speed sensors of the front and rear wheels. The reference vehicle wheel speed obtained for reference use, and the respective vehicle wheel speeds that are obtained based on the respective detection signals from the vehicle wheel speed sensors of the front and rear wheels are compared, whereby it is possible to obtain the respective numbers of teeth of the rotors attached to the front and rear wheels.

However, until calculation of the number of teeth of the respective rotors has been completed in the above described manner, it is not possible to obtain an accurate value for the respective vehicle wheel speeds. Accordingly, during this period, a start threshold value for an anti-skid braking control (hereinafter referred to as "ABS control") is deliberately set to a less sensitive value, and thus it is not possible to perform ABS control. For example, if it is assumed that a normal-use ABS control is started when a slip ratio becomes 20%, a slip ratio of 50% is set as the threshold value. It should be noted that, in this specification the "anti-skid braking control" is taken to perform substantially the same function as an anti-lock brake control of an anti-lock brake system).

In addition, in the above describe art, the numbers of teeth of the respective rotors attached to the front and rear wheels are calculated in a similar way each time the ignition switch is turned on. This tooth number calculation takes, for example, around 4 to 5 seconds to be performed once the vehicle has exceeded a speed of 30 km/h. Thus, in total, it takes around 20 to 30 seconds for the calculation to be performed from when the vehicle starts moving.

Accordingly, if activation of ABS control is required during the period in which the number of teeth of the rotors is being obtained, it is not possible to perform ABS control suitably.

SUMMARY OF THE INVENTION

It is an object of the invention to enable a vehicle wheel speed to be obtained during a calculation period when a number of teeth of a rotor (or a switch number of a rotor switch) is being obtained each time an ignition switch is turned on. Moreover, it is a further object of the invention to enable an ABS control to be performed prior to when a vehicle wheel speed calculation is completed.

According to a first aspect of the invention, respective numbers of teeth or switch numbers of first and second rotors that are estimated by an estimation portion are stored in a non-volatile storage unit. The respective numbers of teeth or switch numbers of the first and second rotors are used to obtain first and second wheel speeds of first and second wheels.

Adoption of this configuration makes it possible to obtain the vehicle wheel speeds even during a calculation period in which the respective numbers of teeth or switch numbers of the first and second rotors are being obtained.

With this configuration, for example, ratios of respective specified numbers of teeth or switch numbers of the first and second rotors and a respective number of teeth or switch number of the first rotor or a respective number of teeth or switch number of the second rotor estimated by the estimation portion may be obtained. In the case that either one of these ratios is equal to or less than a reference value, the respective numbers of teeth or switch numbers of the first and second rotors can be stored in the non-volatile storage unit.

Moreover, the respective numbers of teeth or switch numbers of the first and second rotors may be estimated for each of a predetermined control cycle by the estimation portion. Accordingly, in the case that either one of a number ratio, described below, remains equal to or less than a predetermined reference value for a predetermined time period or longer, the non-volatile storage portion can store the respective numbers of teeth or the switch numbers of the first rotor and the second rotor. The above mentioned number ratios are a ratio of respective specified numbers for the number of teeth or the switch number of the first rotor, and the number of teeth or the switch number of the first rotor estimated by the estimation portion, and a ratio of the respective specified numbers for the number of teeth or the switch number of the second rotor, and the number of teeth or the switch number of the second rotor estimated by the estimation portion.

In addition, the non-volatile storage unit may be configured such that, when the respective numbers of teeth or switch numbers of the first rotor and the second rotor are stored therein, and when the respective numbers of teeth or the switch numbers of the first rotor and the second rotor estimated by the estimation portion include information that is substantially identical to stored information for the numbers of teeth or the switch numbers, the non-volatile storage unit maintains the previous stored information. In this case, the non-volatile storage portion does not perform overwriting using the substantially identical information for the numbers of teeth or the switch numbers of the first rotor and the second rotor estimated by the estimation portion.

According to a second aspect of the invention, the non-volatile storage unit is configured such that, when the respective numbers of teeth or the switch numbers of the first rotor and the second rotor are stored therein, and when the respective numbers of teeth or the switch numbers of the first rotor and the second rotor estimated by the estimation portion include information that is different to the stored information for the numbers of teeth or the switch numbers, the non-volatile storage unit overwrites the stored information using the different information in the case that the different information is received for a predetermined time period. Accordingly, the non-volatile storage unit overwrites the stored information therein with the different information.

With this configuration, in the case that the rotors are replaced for repair or the like, even if rotors with different numbers of teeth to the pre-replacement rotors are mistakenly fitted, it is possible for the numbers of teeth of the rotors to be updated to take this into account. Moreover, this updating is not performed unless the newly learnt numbers of teeth of the rotors remain identical for a period that corresponds to a predetermined number of control cycles. Thus, it possible to avoid the numbers of teeth of the rotors from being mistakenly updated since updating is not performed if a learning result including information that is different to the information presently stored in the non-volatile storage unit is obtained by mistake.

It should be noted that this vehicle wheel speed calculation device may be provided in an ABS control device. In this case, a threshold value setting portion is provided that sets a threshold value to a first value in the case that the respective numbers of teeth or the switch numbers of the first rotor and the second rotor are not stored in the non-volatile storage unit within the vehicle wheel speed calculation device. Further, this threshold value setting portion sets the threshold value to a second value that is lower than the first value in the case that the respective numbers of teeth or the switch numbers are stored in the non-volatile storage unit.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
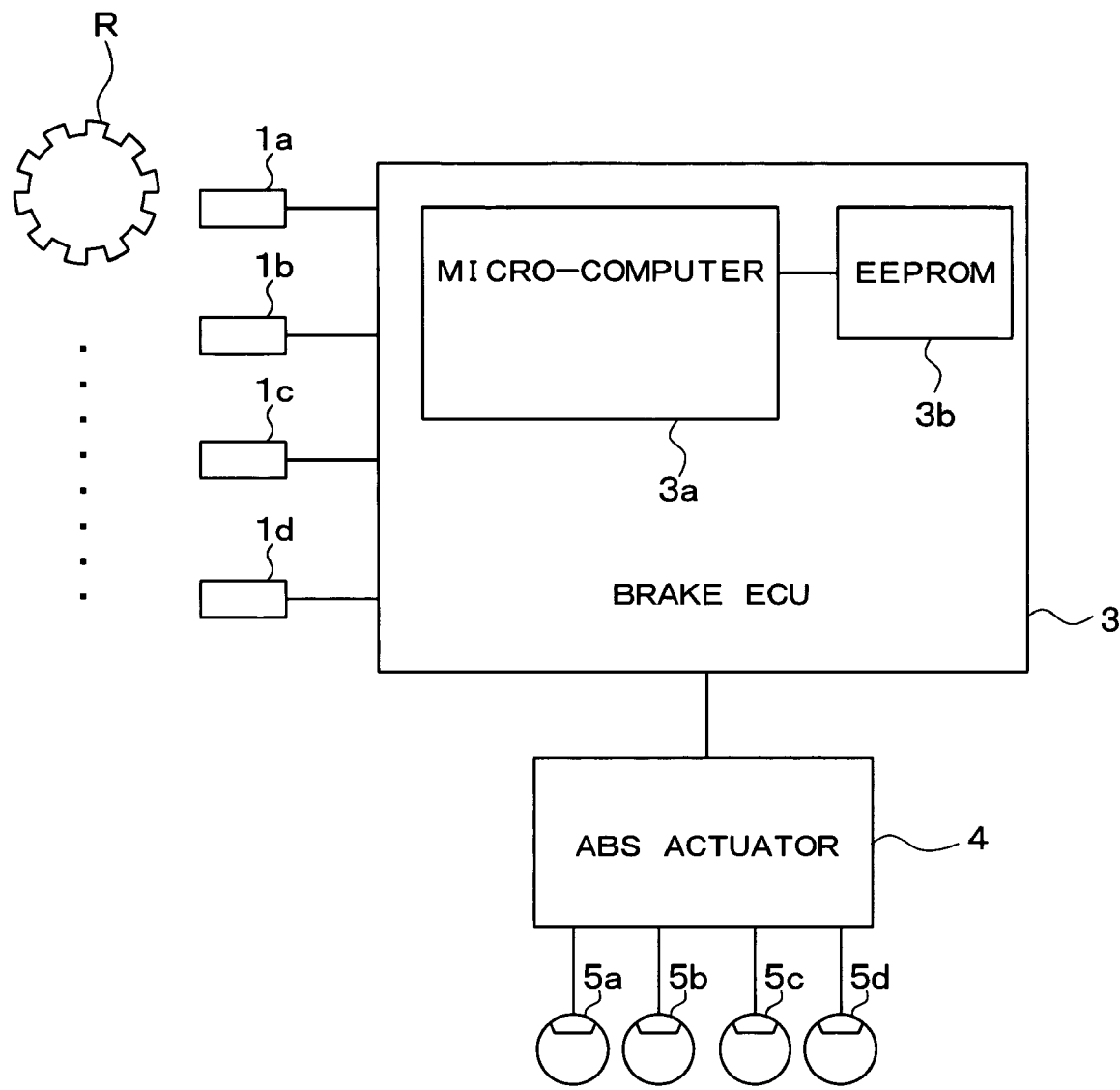
FIG. 1 is a block diagram showing a configuration of an anti-skid braking control system according to a first embodiment.

The present invention will be described further with reference to various embodiments in the drawings.

First Embodiment

FIG. 1 is a block diagram showing a configuration of an anti-skid braking control system (hereinafter simply referred to as an "ABS control system") to which a first embodiment of the invention is applied. The ABS control system of the first embodiment of the invention will be explained with reference to FIG. 1.

The ABS control system includes vehicle wheel speed sensors $1a$ to $1d$, a brake ECU 3, and an ABS actuator 4. The brake ECU 3 and the ABS actuator 4 are used to perform an ABS control that drives an ABS actuator and a traction control.

The vehicle wheel speed sensors $1a$ to $1d$ are provided respectively in each vehicle wheel, not shown, of the vehicle. Respective pulse signals are output from each vehicle wheel speed sensor $1a$ to $1d$. Each pulse signal acts as a vehicle wheel speed signal for the respective vehicle wheel, and is generated along with rotation of respective rotors R (only one of which is shown in FIG. 1) that rotate with each vehicle wheel. Each vehicle wheel speed signal is utilized in various calculations, including a vehicle wheel speed calculation that is performed for each vehicle wheel, a vehicle body speed calculation and a slip ratio calculation.

The brake ECU 3 is configured from a micro-computer $3a$ that corresponds to a calculation portion, an EEPROM $3b$ that corresponds to a non-volatile storage unit, a RAM and a counter (both not shown). The brake ECU 3 corresponds to a braking force control apparatus, and performs brake control of a brake pedal, not shown, in accordance with an operation amount thereof.

The brake ECU 3 receives the vehicle wheel speed signals from the vehicle wheel speed sensors $1a$ to $1d$. The microcomputer $3a$ then calculates the number of teeth of each rotor R based on the respective vehicle wheel speed signals, and the obtained information is stored in the EEPRROM $3b$. Next, the vehicle wheel speed calculation and vehicle body speed calculation are performed based on the stored information for the numbers of teeth. In addition, a slip ratio that is derived from the calculated vehicle wheel speeds and the vehicle body speed is used as a basis for detecting an acceleration slip and a locking tendency of each vehicle wheel. The ECU 3 then outputs a brake control signal to the ABS actuator 4 in order to perform traction control that inhibits the occurrence of acceleration slip or ABS control that inhibits the occurrence of the locking tendency.

More specifically, firstly, the brake ECU 3 obtains vehicle wheel speed signals for: a first vehicle wheel (for example, one of the front wheels) that corresponds to a chosen vehicle wheel selected from among the vehicle wheels of the vehicle; and a second vehicle wheel (for example, one of the rear wheels) that is a vehicle wheel that is different to the first vehicle wheel. These vehicle wheel speed signals are obtained from the signals from the corresponding vehicle wheel speed sensors $1a$ to $1d$. In other words, the brake ECU 3 reads the pulse signals generated by the sensors among the vehicle wheel speed sensors $1a$ to $1d$ that correspond to the first vehicle wheel and the second vehicle wheel. These pulse signals are generated by the corresponding vehicle wheel speed sensors $1a$ to $1d$ along with rotation of the respective rotors R thereof (a first rotor R and a second rotor R), and accord with the number of teeth of each of the first and second rotors R. Note that, it is assumed that the respective number of teeth of the first and second rotors R of the first and second vehicle wheels are respective predetermined numbers. Based on this, the microcomputer $3a$ derives a provisional vehicle wheel speed for the first vehicle wheel and a provisional vehicle wheel speed for the second vehicle wheel using the pulse numbers of the detected pulse signals.

Next, the respective numbers of teeth of the first rotor of the first vehicle wheel and second rotor of the second vehicle wheel are estimated and learnt based upon comparison of the first and second provisional vehicle wheel speeds. Then, processing is performing in which the learnt numbers of teeth of the first and second rotors of the first and second vehicle wheels are stored in the EEPROM 3b. It should be noted that the learnt numbers of teeth are only stored in the EEPROM 3b when they are identical to reference values that are probable values for the number of teeth of each rotor R, namely, when they are determined to be identical to the number of teeth of known manufactured rotors.

Note that, the microcomputer 3a that is provided in the brake ECU 3 includes portions that correspond to first and second signal detection portions. These portions detect signals corresponding to the first and second vehicle wheels from among the signals from the vehicle wheel speed sensors 1a to 1d. Further, the microcomputer 3a also includes: a portion which detects the first and second provisional vehicle wheel speeds and which corresponds to a provisional vehicle wheel speed calculation portion; and a portion which estimates the numbers of teeth of the first and second rotors R of the first and second vehicle wheels and which corresponds to an estimation portion.

The ABS actuator 4 regulates a brake fluid pressure that is applied to respective wheel cylinders (W/C) 5a to 5d provided in each vehicle wheel, and is driven in accordance with a brake control signal from the brake ECU 3. The ABS actuator 4 may include within its housing a brake circuit, a motor that drives a pump, and solenoid valves that control opening/closing of the brake circuit. When a control voltage is applied, for example, to solenoids that drive the solenoid valves and the motor and based on a signal from the ECU 3, the path of the brake circuit within the ABS actuator 4 is set in accordance with the applied voltage. Further, brake fluid pressure is generated in the W/Cs 5a to 5d in accordance with the set path within the brake circuit, whereby the ABS actuator 4 is able to control the braking force applied to each wheel.

Figure 2A:
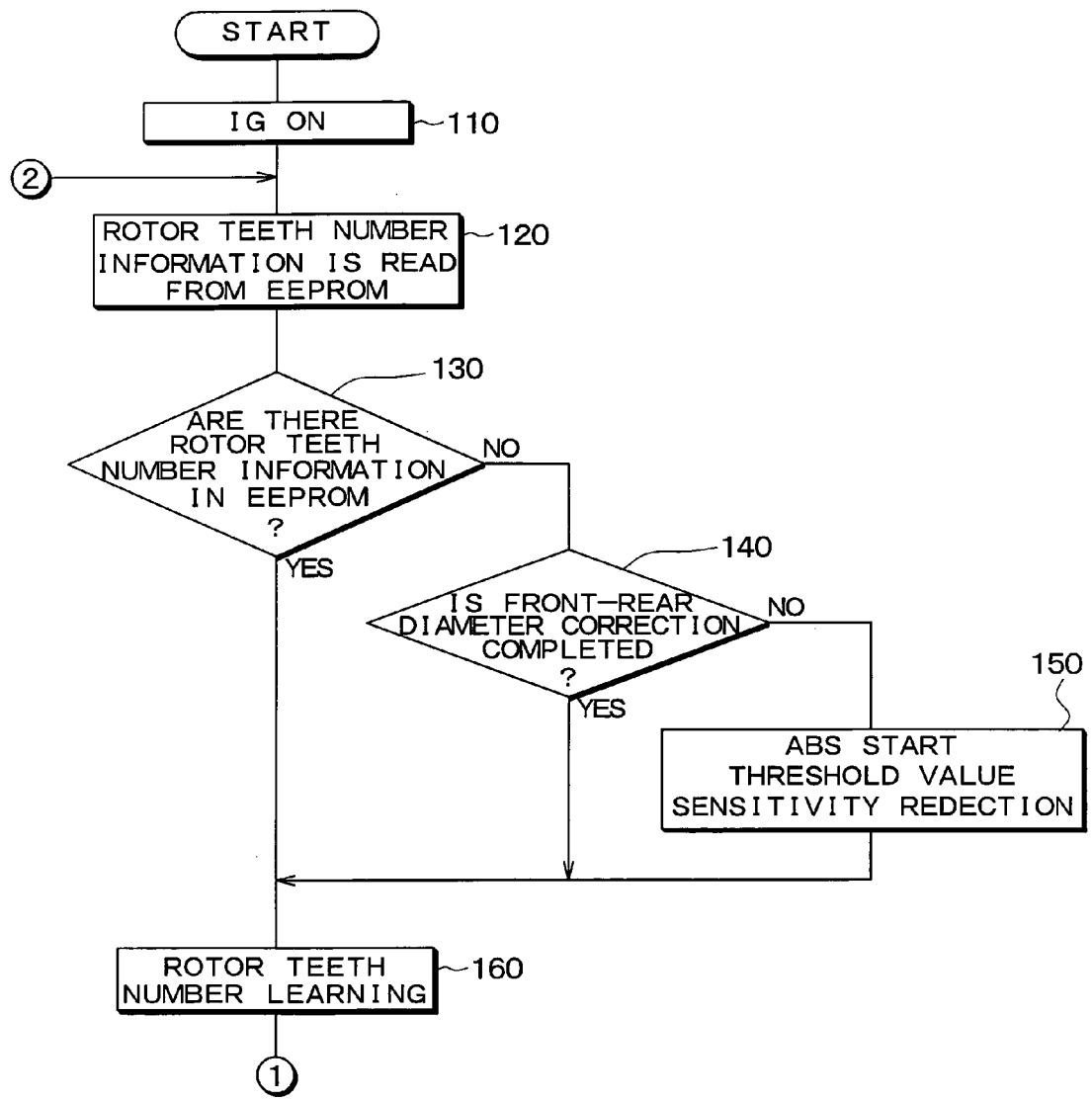
FIG. 2 is a flow chart illustrating a rotor teeth number learning process and an anti-skid braking control threshold value setting process that are performed by the ABS control system shown in FIG. 1.
Figure 2B:
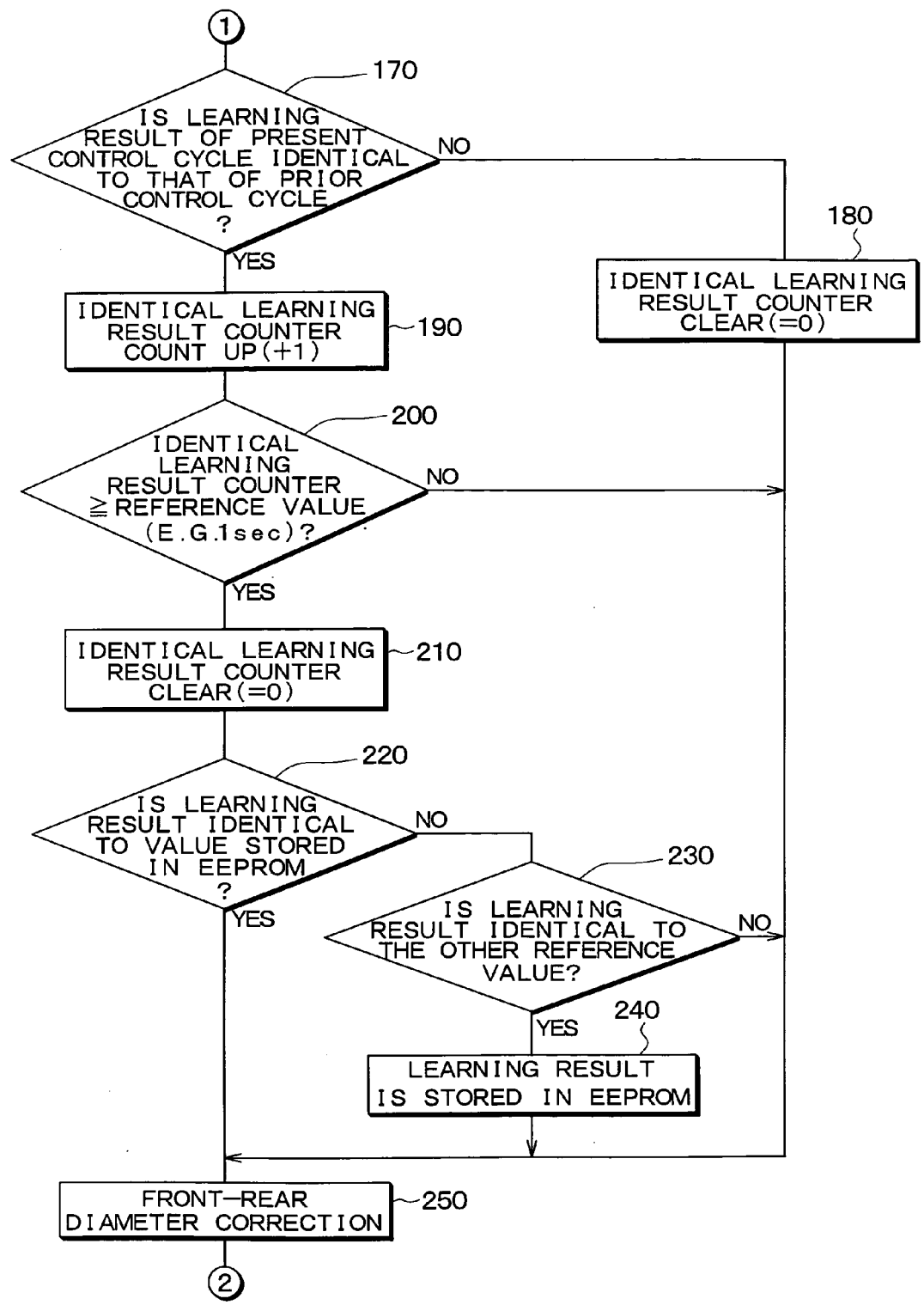

Next, an explanation will be given concerning a rotor teeth number learning process and an ABS control threshold value setting process that are performed by the ABS control system with the above configuration. This explanation will be based on the flow charts for these processes that are shown in FIG. 2.

The rotor teeth number learning process and the ABS control threshold value setting process are performed by the brake ECU 3 at the time when an ignition switch, not shown, of the vehicle is turned on. More specifically, the processes are performed when the ECU 3 receives the respective pulse signals from the vehicle wheel speed sensors 1a to 1d.

First, at 110, the ignition switch is turned on. Then, the routine proceeds, and, at 120, any information concerning the numbers of teeth of the respective rotors R (hereinafter referred to as "rotor teeth number information") that is stored in the EEPROM 3b at that time is read. Note that, if no information is stored in the EEPROM 3b, then information indicating this fact is received. Then, the routine proceeds to the processing at 130. Note that, the processing at 110 and 120 is only performed immediately after the ignition switch is turned on. Accordingly, only the processing at 130 and after is performed for each normal control cycle.

At 130, it is confirmed whether any rotor teeth number information is stored in the EEPROM 3b based on the results of the processing at 120. Note that, if the vehicle is run once following manufacture, rotor teeth number information is stored within the EEPROM 3b by the processing at 240, described hereinafter. Accordingly, the determination result at 130 will only be NO in the case that no rotor teeth number information is stored, namely, when the vehicle has never been run. If the determination result at 130 is NO, the routine proceeds to the processing at 140.

At 140, it is determined whether a front-rear diameter correction processing is completed or not. The determination of this processing is based on whether a flag has been set by a front-rear diameter correction processing, described hereinafter. The flag is set when front-rear correction has been completed. In the front-rear diameter correction processing, the respective vehicle wheel speeds of the front and rear wheels are corrected based on a ratio of the tire diameters of the front and rear wheels (hereinafter referred to as the "front-rear wheel tire diameter ratio"). Accordingly, it is not possible to obtain accurate values for the vehicle wheel speed for the front and rear wheels prior to when the front-rear diameter correction is completed. However, once the correction is completed, accurate values for the vehicle wheel speeds of the front and rear wheels can be obtained.

If the determination result at 140 is NO, the routine proceeds to the processing at 150, where threshold value sensitivity reduction processing is performed. This threshold value sensitivity reduction processing changes a threshold value that determines a timing when ABS control is started. More specifically, as an example, let it be assumed the timing at which the ABS control is normally started is based on, for example, when a slip ratio obtained from the vehicle wheel speed and the vehicle body speed of each vehicle wheel has reached a first threshold value (for example, 20%). In this case, the first threshold value is changed and set to a second threshold value (for example, 50%). Thus, when it is not possible to accurately obtain the vehicle wheel speeds, it is possible to perform setting such that the ABS control is started less easily.

However, if the determination result at 140 is YES, the routine proceeds to the processing at 160 without the processing at 150 being performed. In other words, in this case, it is possible to accurately obtain the vehicle wheel speeds. Accordingly, there is no need to make the ABS control less easy to start, and so the slip ratio is not changed from the threshold value (in this case, 20%) that determines the timing when the ABS control is normally started.

Next, at 160, the rotor teeth number learning process is performed. More specifically, as described previously, it is assumed that that the number of teeth of the rotors R is a certain number (for example, 105 teeth). Then, the first provisional vehicle wheel speed and the second provisional vehicle wheel speed are derived from the detected pulse numbers of the respective pulse signals. The first provisional vehicle wheel speed is adopted as a provisional vehicle wheel speed for the first vehicle wheel, and the second provisional vehicle wheel speed is adopted as a provisional vehicle wheel speed for the second vehicle wheel.

Following this, the respective numbers of teeth of the first rotor of the first vehicle wheel and the second rotor of the second vehicle wheel are estimated based on the ratio of the first provisional vehicle wheel speed and the second provisional vehicle wheel speed. Note that, for example, if the actual number of teeth of the first rotor of the first vehicle wheel is, for example, 102, while the first provisional vehicle wheel speed is calculated based upon the assumption that the number of teeth is 105, the calculated first provisional vehicle wheel speed will be slower than the actual vehicle wheel speed of the first vehicle wheel. On the other hand, if the actual number of teeth of the second rotor of the second vehicle wheel is, for example, 108, while the second provisional vehicle wheel speed is calculated based upon the assumption that the number of teeth is 105, the calculated second provisional vehicle wheel speed will be faster than the actual vehicle wheel speed of the second vehicle wheel. Accordingly, by obtaining the ratio of the first and second provisional vehicle wheel speeds it is possible to estimate which of the number of teeth of the first and second rotors R of the respective first and second vehicle wheels is larger, and/or how many teeth each of the first and second rotors R have. The estimated number of teeth of the first and second rotors R of the first and second vehicle wheels are stored temporarily in the RAM and learnt.

Next, the routine proceeds, and at 170, it is determined whether a learning result stored in the RAM for the prior control cycle is identical to a learning result stored in the RAM for the present control cycle. In the case that the learning results are different, the routine proceeds to the processing at 180, and an identical learning result counter that indicates whether the learning results are identical is reset to zero. On the other hand, if the learning results are identical, the routine proceeds to the processing at 190. In this case, an increment of one is added to the identical learning results counter, whereby the value indicated by the identical learning result counter increases.

At 200, it is determined whether the value of the identical learning result counter has exceeded a pre-set reference value (for example, the number of control cycles that are equivalent to 1 sec, namely, if the control cycle is 8 ms, 125 times). If the determination result at 200 is YES, the learning result is taken to be reliable information that can be used for determining the numbers of teeth of the rotors R, and the routine proceeds to the processing at 220. On the other hand, if the determination result at 200 is NO, the learning result is taken to be unreliable information that cannot be used for determining the numbers of teeth of the rotors R. Accordingly, the routine proceeds to the processing at 250.

At 220, it is determined if the learning result is identical to the value that is stored in the EEPROM 3b. In the case that rotor teeth number information is already stored in the EEPROM 3b, this processing is performed by comparing the learning result with the rotor teeth number information stored therein. However, if no such information is stored in the EEPROM 3b, the determination result is NO. Note that, if the ratio of the value stored in the EEPROM 3b for the number of teeth of each rotor R and the learnt number of teeth is within a predetermined range (for example, +0.1 to 5%), then it is determined that the learnt number of teeth is identical to the value stored in the EEPROM 3b.

In the case that the determination result at 220 is NO, the routine proceeds to the processing at 230. Here, it is determined whether the learning result is identical to the other reference values, that is, the reference values that are the probable values for the number of teeth or the switch number of each rotor R (namely, the known values for the number of teeth or switch number of manufactured rotors). More specifically, if the ratio of a reference value for each rotor R and the learnt number of teeth for each rotor R is within a predetermined range (for example, +0.1 to 5%), it is determined that the learnt number of teeth is identical to the reference value.

If the determination result at 220 is YES, the learning result is determined to be suitable for use as the numbers of teeth of the rotors R. Accordingly, the routine proceeds to the processing at 240, where the learning result for the numbers of teeth of the rotors R is stored in the EEPROM 3b. The routine then proceeds to the processing at 250. On the other hand, if the determination result at 220 is NO, the learning result is determined to be unsuitable for use as the numbers of teeth of the rotors R. Thus, the routine proceeds straight to the processing at 250.

At 250, the front-rear diameter correction processing is performed. As described previously, in the front-rear diameter correction processing, the respective vehicle wheel speeds obtained from the detections signals from the vehicle wheel speed sensors 1a to 1d are corrected based on the front-rear wheel tire diameter ratio so as to obtain the vehicle wheel speed of each vehicle wheel. Note that, the number of teeth of each rotor R are required by the front-rear diameter correction processing in order to obtain the respective vehicle wheel speeds using the detection signals from each vehicle wheel speed sensor 1a to 1d. Given this, in this case as well, the respective vehicle wheel speeds are obtained while assuming that the number of teeth of each rotor R is a reference value, for example, 105 teeth.

As an example, the front-rear wheel tire diameter ratio of the front and rear wheels may be derived by calculating a ratio of summed values of the vehicle wheel speeds. These summed values are obtained by summing of the vehicle wheel speeds of the front and rear wheels obtained for each control cycle for a one second period. Note that, the front-rear wheel tire diameter ratio can be accurately obtained even if provisional values are used for the number of teeth of each rotor R instead of accurate values. Further, the front-rear diameter correction processing is completed once, for example, when the respective vehicle wheel speeds have been obtained for the one second period following turning on of the ignition switch. Thus, when the front-rear diameter correction processing is completed once, the RAM flag of the micro-computer 3a is set. Of course, the front-rear diameter correction processing is continued sequentially after this. Accordingly, if, for example, a tire air pressure of one of the vehicle wheels were to reduce, it is possible for the front-rear diameter correction processing to obtain a front-rear wheel tire diameter ratio that takes this change into account.

When the front-rear diameter correction processing is completed, the routine returns once again to the processing at 120, and the processing routine described above is repeated. Note that, as described above, the front-rear diameter correction processing is completed once when, for example, the vehicle wheel speeds are obtained for a one second period. Thus, the processing is completed prior to when the number of teeth of each rotor R is stored in the EEPROM 3b. Accordingly, the sensitivity reduction processing for the threshold value of the slip ratio that determines when the ABS control is started is only performed when it is determined that there is no rotor teeth number information stored in the EEPROM 3b at 130, and when it is determined that the front-rear diameter correction processing has not been completed at 140.

As will be apparent from the above explanation, the ABS control system according to the embodiment is configured such that information related to the respective numbers of teeth of the rotors R is obtained temporarily and then stored in the EEPROM 3b. Accordingly, once the ignition switch has been turned on initially, it is possible to obtain the vehicle wheel speed of each vehicle wheel based on the numbers of teeth for the respective rotors R that are stored in the EEPROM 3b. Thus, it is possible to obtain the vehicle wheel speeds even during the calculation period of the numbers of teeth of the rotors R each time the ignition switch is turned on. Further, it is also possible to perform ABS control during the period until the vehicle wheel speed calculation is completed.

Moreover, when the respective numbers of teeth of the rotors R are temporarily stored in the EEPROM 3b, the vehicle wheel speeds that are stored are based fundamentally on the stored information about the numbers of teeth. Accordingly, when the newly learnt numbers of teeth for the rotors R are identical for a period corresponding to a predetermined number of control cycles (refer to the processing at 200), and when the learning result is identical to the other reference values (refer to the processing at 240), the numbers of teeth of the rotors R are updated. Thus, if the rotors R are replaced for repair or the like, even if rotors with different numbers of teeth to the pre-replacement rotors R are mistakenly fitted, it is possible for the numbers of teeth of the rotors R to be updated to take this into account. Moreover, this updating is not performed unless the newly learnt numbers of teeth of the rotors R are identical for the period corresponding to a predetermined number of control cycles. Thus, it possible to avoid the numbers of teeth of the rotors R from being mistakenly updated since updating is not performed if a learning result including information that is different to the information presently stored in the EEPROM 3b is obtained by mistake.

Other Embodiments

In the above described embodiment, an example is described of a case where the rotors R have a toothed wheel shape. However, the invention may be applied to a rotor switch device configured with a rotor that is coated with a resin or the like, but which has metal surfaces left exposed at areas that correspond to the teeth of the gear of the rotor R. In this case, the switch number of the rotor corresponds to the number of teeth of the rotor R of the first embodiment.

While the above description is of the preferred embodiments of the present invention, it should be appreciated that the invention may be modified, altered, or varied without deviating from the scope and fair meaning of the following claims.

What is claimed is:

1. A vehicle wheel speed calculation device comprising:
   a first signal detection portion for reading a first pulse signal that is generated by a first wheel speed sensor when a first rotor rotates along with a first wheel attached to a vehicle, the pulse signal according with either one of a number of teeth and a switch number of the first rotor;
   a second signal detection portion for reading a second pulse signal that is generated by a second wheel speed sensor when a second rotor rotates along with a second wheel attached to the vehicle, the pulse signal according with one of a number of teeth and a switch number of the second rotor;
   a provisional vehicle wheel speed calculation portion which assumes that the respective numbers of teeth and the switch numbers of the first rotor and the second rotor are respective predetermined numbers, and which obtains a first provisional vehicle wheel speed that is taken as a provisional wheel speed for the first wheel based on a pulse number of the first pulse signal detected by the first signal detection portion, and the respective predetermined numbers, and which obtains a second provisional vehicle wheel speed that is taken as a provisional wheel speed for the second wheel based on a pulse number of the second pulse signal detected by the first signal detection portion and the respective predetermined numbers;
   an estimation portion for estimating one of the respective numbers of teeth and the switch numbers of the first rotor and the second rotor based on a ratio of the first provisional vehicle wheel speed and the second provisional vehicle wheel speed;
   a non-volatile storage unit for storing one of the respective numbers of teeth and the switch numbers of the first rotor and the second rotor that are estimated by the estimation portion; and
   a vehicle wheel speed calculation portion for deriving a vehicle wheel speed of the first wheel and a vehicle wheel speed of the second wheel based on one of the respective numbers of teeth and the switch numbers for the first rotor and the second rotor stored in the non-volatile storage unit, and the respective detection results from the first signal detection portion and the second signal detection portion.

2. The vehicle wheel speed calculation device according to claim 1, wherein
   the non-volatile storage unit stores one of the respective numbers of teeth and the switch numbers of the first rotor and the second rotor in the case that a number ratio is equal to or less than a predetermined reference value, the number ratio being one of a ratio of respective specified numbers for one of the numbers of teeth and the switch numbers of the first rotor, and one of the numbers of teeth and the switch numbers of the first rotor estimated by the estimation portion, and a ratio of respective specified numbers for one of the numbers of teeth and the switch numbers of the second rotor, and one of the numbers of teeth and the switch numbers of the second rotor estimated by the estimation portion.

3. The vehicle wheel speed calculation device according to claim 1, wherein
   the provisional vehicle wheel speed calculation device obtains the first provisional vehicle wheel speed and the second provisional vehicle wheel speed for each of a predetermined control cycle,
   the estimation portion estimates one of the respective numbers of teeth and the switch numbers of the first rotor and the second rotor for each of the predetermined control cycle, and
   the non-volatile storage portion stores one of the respective numbers of teeth and the switch numbers of the first rotor and the second rotor in the case that the number ratio remains equal to or less than the predetermined reference value for a predetermined time period or longer, the number ratio being one of the ratio of the respective specified numbers for one of the number of teeth and the switch number of the first rotor, and one of the number of teeth and the switch number of the first rotor estimated by the estimation portion, and the ratio of the respective specified numbers for one of the number of teeth and the switch number of the second rotor, and one of the number of teeth and the switch number of the second rotor estimated by the estimation portion.

4. The vehicle wheel speed calculation device according to claim 3, wherein
   the non-volatile storage unit is configured such that, when one of the respective numbers of teeth and the switch numbers of the first rotor and the second rotor are stored therein, and when one of the respective numbers of teeth and the switch numbers of the first rotor and the second rotor estimated by the estimation portion include information that is substantially identical to stored information for one of the numbers of teeth and the switch numbers, the non-volatile storage unit maintains the previous stored information and does not overwrite the stored information using the substantially identical information for the respective one of the numbers of teeth and the switch numbers of the first rotor and the second rotor estimated by the estimation portion.

5. The vehicle wheel speed calculation device according to claim 3, wherein
the non-volatile storage unit is configured such that, when one of the respective numbers of teeth and the switch numbers of the first rotor and the second rotor are stored therein, and when one of the respective numbers of teeth and the switch numbers of the first rotor and the second rotor estimated by the estimation portion include information that is different to the stored information for one of the numbers of teeth and the switch numbers, the non-volatile storage unit overwrites the stored information using the different information in the case that the different information is continuously received from the estimation portion for a predetermined time period.

6. The vehicle wheel speed calculation device according to claim 4, wherein
the non-volatile storage unit is configured such that, when one of the respective numbers of teeth and the switch numbers of the first rotor and the second rotor are stored therein, and when one of the respective numbers of teeth and the switch numbers of the first rotor and the second rotor estimated by the estimation portion include information that is different to the stored information for one of the numbers of teeth and the switch numbers, the non-volatile storage unit overwrites the stored information using the different information in the case that the different information is continuously received from the estimation portion for a predetermined time period.

7. An anti-skid braking control apparatus that includes the vehicle wheel speed calculation device according to claim 1, wherein
the anti-skid braking control apparatus uses respective wheel speeds for the first wheel speed and the second wheel speed calculated by the vehicle wheel speed calculation device as a basis for calculating a vehicle speed of the vehicle, and performs an anti-skid braking control when a slip ratio that is derived from the vehicle speed and the respective wheel speeds exceeds a threshold value,
the anti-skid braking control apparatus comprising a threshold value setting portion for setting a threshold value that acts as a start condition for the anti-skid braking control, the threshold value setting portion setting the threshold value to a first value in the case that one of respective numbers of teeth and the switch numbers of the first rotor and the second rotor are not stored in the non-volatile storage unit within the vehicle wheel speed calculation device, and setting the threshold value to a second value that is lower than the first value in the case that one of the respective numbers of teeth and the switch numbers are stored in the non-volatile storage unit.

8. An anti-skid braking control apparatus that includes the vehicle wheel speed calculation device according to claim 2, wherein
the anti-skid braking control apparatus uses respective wheel speeds for the first wheel speed and the second wheel speed calculated by the vehicle wheel speed calculation device as a basis for calculating a vehicle speed of the vehicle, and performs an anti-skid braking control when a slip ratio that is derived from the vehicle speed and the respective wheel speeds exceeds a threshold value,
the anti-skid braking control apparatus comprising a threshold value setting portion for setting a threshold value that acts as a start condition for the anti-skid braking control, the threshold value setting portion setting the threshold value to a first value in the case that one of respective numbers of teeth and the switch numbers of the first rotor and the second rotor are not stored in the non-volatile storage unit within the vehicle wheel speed calculation device, and setting the threshold value to a second value that is lower than the first value in the case that one of the respective numbers of teeth and the switch numbers are stored in the non-volatile storage unit.

9. An anti-skid braking control apparatus that includes the vehicle wheel speed calculation device according to claim 3, wherein
the anti-skid braking control apparatus uses respective wheel speeds for the first wheel speed and the second wheel speed calculated by the vehicle wheel speed calculation device as a basis for calculating a vehicle speed of the vehicle, and performs an anti-skid braking control when a slip ratio that is derived from the vehicle speed and the respective wheel speeds exceeds a threshold value,
the anti-skid braking control apparatus comprising a threshold value setting portion for setting a threshold value that acts as a start condition for the anti-skid braking control, the threshold value setting portion setting the threshold value to a first value in the case that one of respective numbers of teeth and the switch numbers of the first rotor and the second rotor are not stored in the non-volatile storage unit within the vehicle wheel speed calculation device, and setting the threshold value to a second value that is lower than the first value in the case that one of the respective numbers of teeth and the switch numbers are stored in the non-volatile storage unit.

10. An anti-skid braking control apparatus that includes the vehicle wheel speed calculation device according to claim 4, wherein
the anti-skid braking control apparatus uses respective wheel speeds for the first wheel speed and the second wheel speed calculated by the vehicle wheel speed calculation device as a basis for calculating a vehicle speed of the vehicle, and performs an anti-skid braking control when a slip ratio that is derived from the vehicle speed and the respective wheel speeds exceeds a threshold value,
the anti-skid braking control apparatus comprising a threshold value setting portion for setting a threshold value that acts as a start condition for the anti-skid braking control, the threshold value setting portion setting the threshold value to a first value in the case that one of respective numbers of teeth and the switch numbers of the first rotor and the second rotor are not stored in the non-volatile storage unit within the vehicle wheel speed calculation device, and setting the threshold value to a second value that is lower than the first value in the case that one of the respective numbers of teeth and the switch numbers are stored in the non-volatile storage unit.

11. An anti-skid braking control apparatus that includes the vehicle wheel speed calculation device according to claim 5, wherein the anti-skid braking control apparatus uses respective wheel speeds for the first wheel speed and the second wheel speed calculated by the vehicle wheel speed calculation device as a basis for calculating a vehicle speed of the vehicle, and performs an anti-skid braking control when a slip ratio that is derived from the vehicle speed and the respective wheel speeds exceeds a threshold value, the anti-skid braking control apparatus comprising a threshold value setting portion for setting a threshold value that acts as a start condition for the anti-skid braking control, the threshold value setting portion setting the threshold value to a first value in the case that one of respective numbers of teeth and the switch numbers of the first rotor and the second rotor are not stored in the non-volatile storage unit within the vehicle wheel speed calculation device, and setting the threshold value to a second value that is lower than the first value in the case that one of the respective numbers of teeth and the switch numbers are stored in the non-volatile storage unit.

12. An anti-skid braking control apparatus that includes the vehicle wheel speed calculation device according to claim 6, wherein the anti-skid braking control apparatus uses respective wheel speeds for the first wheel speed and the second wheel speed calculated by the vehicle wheel speed calculation device as a basis for calculating a vehicle speed of the vehicle, and performs an anti-skid braking control when a slip ratio that is derived from the vehicle speed and the respective wheel speeds exceeds a threshold value, the anti-skid braking control apparatus comprising a threshold value setting portion for setting a threshold value that acts as a start condition for the anti-skid braking control, the threshold value setting portion setting the threshold value to a first value in the case that one of respective numbers of teeth and the switch numbers of the first rotor and the second rotor are not stored in the non-volatile storage unit within the vehicle wheel speed calculation device, and setting the threshold value to a second value that is lower than the first value in the case that one of the respective numbers of teeth and the switch numbers are stored in the non-volatile storage unit.

* * * * *